2,839,084

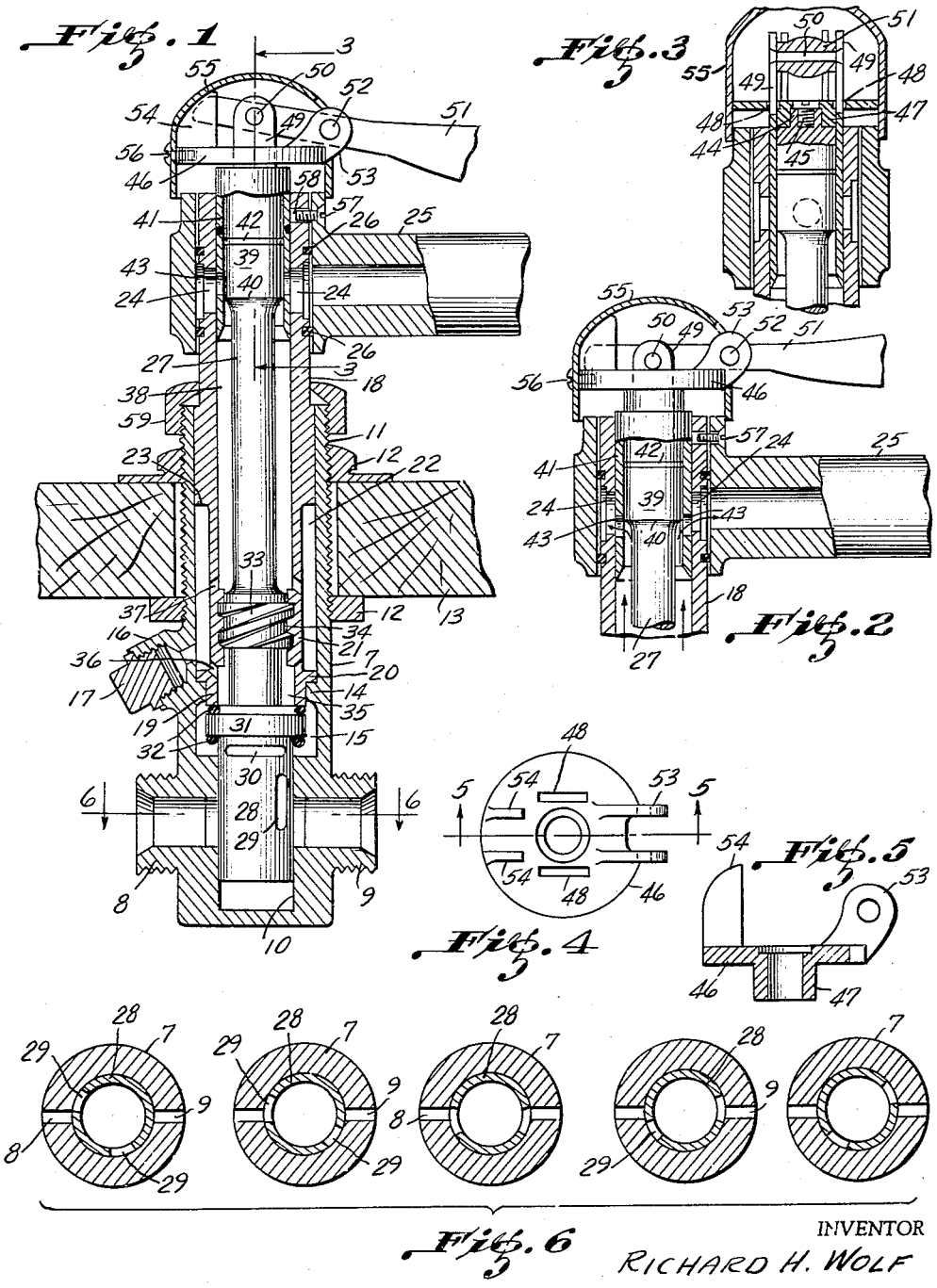
June 17, 1958 — R. H. WOLF — 2,839,084
FLOW CONTROL VALVE
Filed June 3, 1955
INVENTOR
RICHARD H. WOLF United States Patent Office 2,839,084
Patented June 17, 1958

FLOW CONTROL VALVE

Richard H. Wolf, Gary, Ind.

Application June 3, 1955, Serial No. 513,019

7 Claims. (Cl. 137—636.2)

This invention is a swing spout combination faucet adapted primarily to be used in connection with hot and cold water lines, providing means of novel construction in a single fixture to enable hot or cold water to pass therefrom or a desired mixture of waters of different temperatures to be drawn from the single fixture.

A further object of the invention is to provide a valve involving a unitary structure provided with simple, easily operated means whereby the temperature of liquid issuing from the spout may easily and accurately be determined.

A further object of the invention is to provide a valve structure of the character stated, equipped with additional means whereby a spray head may be easily attached thereto and readily operated to discharge liquid at the desired temperature.

A still further object is to provide a valve structure capable of being easily operated to determine the temperature of the liquid within the valve, with additional means to regulate the flow or pressure in the discharge spout.

A still further object of the invention is to provide a valve structure embodying means whereby the pressure as well as the temperature of the mixture within the valve may be regulated and set, with additional means to govern the flow of the mixed fluid from the spout at the temperature already determined by the initial regulating means.

A still further and particular object of the invention is to provide a valve of the character generally set forth which is of extremely simple construction, which involves but few simple and readily assembled parts, which has its several parts so constructed and assembled as to insure proper functioning at all times, to minimize the opportunity for wear, breakage or derangement, which is positive in all its several actions, and which will prove highly effective and efficient in practice.

With the foregoing objects in view, together with others which will appear as the description proceeds, the invention resides in the novel construction, combination and arrangement of parts, all as will be described more fully hereinafter, illustrated in the drawing, and particularly pointed out in the claims.

In the drawing:

Fig. 1 is a vertical longitudinal sectional view taken through a valve structure involving the invention, the parts being in the position they will assume with the valve closed, Fig. 2 is a fragmentary sectional view similar to Fig. 1 and showing the flow control mechanism with the parts in the position they will assume to discharge fluid from the spout, Fig. 3 is a fragmentary sectional view taken substantially upon line 3—3 of Fig. 1, Fig. 4 is a top plan view of the lever supporting plate, Fig. 5 is a transverse sectional view taken upon line 5—5 of Fig. 4, and Fig. 6 is a transverse sectional view taken substantially upon line 6—6 of Fig. 1 showing the various positions assumed by the measuring bell or cylinder in determining the rate of flow from the feeder mains to the interior of the valve as well as the proportions of hot and cold water admitted to the inlet chamber.

The faucet of my invention may be used in connection with wash stands or other bathroom fixtures as well as with basins, kitchen sinks or other apparatus, with or without a spray head connection.

In carrying out the invention I provide an elongated hollow cylindrical body 7 having divergent nipples 8 and 9 at its lower end for connection respectively to hot and cold water mains (not shown). These nipples lead to the interior of the body 7 and into a reduced bore 10. The upper end of the body 7 is exteriorly threaded as indicated at 11 to receive spaced clamping nuts 12 by means of which the valve body may be secured to a wash basin or wash stand portion indicated at 13.

The interior of the body 7 is provided near its lower end with an annular shoulder 14 below which is provided a mixing chamber 15. The body is also provided above the mixing chamber with an outlet 16 closed by a plug 17 and which may serve to establish a connection between a suitable spray nozzle and the interior of the valve body.

Arranged longitudinally within the body 7 is a core or sleeve 18, the lower end of which has a reduced external diameter to provide a neck 19 to fit within the annular projection 14 of the body 7. This neck is provided with an annular flange 20 to rest upon the shoulder 14, and it will be observed that the exterior diameter of the core or sleeve 18 is reduced as at 21 to provide a chamber 22 between the flange 20 and the shoulder 23 spaced upwardly a short distance on the core 18.

The upper end of the core or sleeve 18 is provided with lateral ports 24 which communicate with the bore of a swing spout 25 rotatably mounted upon the core or sleeve. Gaskets 26 are provided to prevent leakage between the core and the swing spout. These ports 24 communicate with the interior of the core or sleeve.

Arranged for rotative movement within the core 18 is an operating shaft 27, having integrally formed therewith at its lower end a hollow bell 28 snugly seated within bore 10 of the lower end of the housing 7. This bell is provided with spaced openings 29 at its medial portion and additional openings 30 at that portion of the bell disposed within the mixing chamber. The shaft is provided with an annulus 31 disposed within the mixing chamber and gaskets 32 on the lower and upper faces of said annulus constitute sealing members for the annulus when the shaft is in either open or closed pressure positions. Spaced above the annulus 31 is an enlargement 33 having threads as shown to engage with threads of a corresponding pitch 34 on the inner surface of the core or sleeve 18, and it is obvious from this construction that rotative movement of the shaft 27 in one direction will move the annulus 31 downwardly until it engages with the bottom of the mixing chamber and seals therewith, or when rotated to its limit in the opposite direction the annulus will be moved upwardly into sealing engagement with the lower end of the core or sleeve 18 to sever communication between the mixing chamber and the interior of the core or sleeve. When moved to an intermediate position, liquid entering the base of the housing may pass through the openings 29—30, into the mixing chamber 15 and then above the annulus 31 and to the space 35 between the shaft 27 and the inner surface of the core 18. Ports or openings 36 above the shoulder 20 permit fluid to pass from the chamber 35 to the chamber 22, and ports or openings 37 in the wall of the core establish communication between the chamber 22 and the space 38 between the shaft 27 and the interior walls of the core or sleeve 18.

The upper end of the shaft 27 is enlarged to provide a head 39 providing a shoulder 40 at its lower end. This cylindrical head 39 fits snugly within a cylinder 41 which also snugly engages on its outer surface with the interior surface of the core or sleeve 18. The head 39 is provided with an annular gasket 42 to prevent leakage of liquid beyond the head. The side walls of the cylinder 41 are provided with an annular sealing gasket as shown, and with ports or openings 43 establishing communication between the interior of the cylinder and the ports 24 in the core or sleeve 18. The ports 43 are at all times in register with the openings 24 in the core or sleeve, but are so positioned with respect to the shoulder 40 of the shaft that vertical movements of the cylinder determine the flow of fluid from the channel 38 to the openings or ports 24.

The upper extremity of the shaft 27 is reduced as at 44 and provided with an axial interiorly threaded bore to receive a screw 45 passing downwardly and centrally through a cap plate 46, an annular cuff 47 being provided upon the undersurface of the cap plate 46 to snugly fit upon the member 44. The cap plate 46 is provided with spaced slots 48 through which arms 49 integral with the cylinder 41 slidingly project, the said arms being pivotally connected as at 50 by a pin to a handle member 51 disposed laterally of the housing. This handle is pivoted as at 52 to spaced ears 53 integral with the cap plate 46 and at one side thereof, while the opposite or free end of the handle is confined between upstanding ears 54 at the opposite side of the cap plate 46. A hood 55 is secured over the cap plate and is attached to the latter by screws or other securing elements 56. A screw 57 passes through the base of the swing spout and travels in an arcuate slot 58 in the core or sleeve 18.

A nut 59 encircles the core or sleeve 18 and engages with the threads 11 of the housing 7 to hold the parts in assembled relationship.

With the valve structure thus described affixed to the support 13 and connected to the hot and cold water lines, with the parts in the position shown in Fig. 1, the annulus 31 is in tight seating engagement with the lower end of the core or sleeve 18 to prevent flow of water from the mixing chamber 15 to the chamber 35. In operating the faucet, the handle 51 is grasped and moved in the horizontal plane so as to rotate the shaft 27, whereupon the threads 33 cause the shaft to move downwardly until the upper head of the annulus 31 is disengaged from the seat at the lower end of the core 18. Water will then be admitted through the openings 29—30 and will pass into the mixing chamber 15. However, no water can flow through the swing spout 25 because the openings or ports 43 in the cylinder 41 are disposed above the shoulder 40 of the head 39. When it is desired to start the flow, a lifting action on handle 41 moves the inner end of the handle in a downward direction, forcing the cylinder 41 down until the ports 43 clear the lower end of the shoulder 40, as shown more particularly in Fig. 2 of the drawings, whereupon the liquid within the channel or chamber 18 will pass through the openings 24 and out through the swing spout. Careful rotary movement of the shaft 27 will determine the proportion of hot and cold water admitted through the ports 29—30 to the mixing chamber. The various positions of the hollow bell 28 with respect to the hot and cold water inlets are shown in the several views of Fig. 6, and these positions are governed by the rotary movements of the shaft as will be understood.

The water or other liquid in the desired proportions of hot and cold will be admitted to the mixing chamber 15, from whence it flows into the chamber 35, then through ports 36 to the chamber 22, thence through ports 37 to the chamber 38 and out through the swing spout. The quantity of fluid delivered through the swing spout is accurately determined by vertical swinging movements of the handle 51, this flow being minutely controlled by positioning the ports 43 of the cylinder 41 properly with respect to the shoulder 40 at the lower end of head 39.

It is apparent from the foregoing that I have provided an extremely simple and efficient structure assembled as a unit for admitting and properly proportioning hot and cold water before its delivery to the swing spout, and for accurately governing the rate of flow after the desired temperature of the liquid has been determined.

I claim:

1. In a valve structure, a hollow cylindrical core having a fluid inlet at one end and a lateral outlet opening at its opposite end, a shaft of less diameter than said core mounted for rotary and longitudinal movement therein to control the flow of fluid from said inlet end to the space between said shaft and the walls of said core, a head on said shaft having a shoulder disposed within the edges of said outlet opening, a hollow cylinder enclosing said head and having its walls interposed between said head and the adjacent inner walls of said core, said cylinder having a lateral port in communication with said outlet opening and normally overlying said head, and means for sliding said cylinder to position portions of said port beyond said shoulder.

2. In a valve structure, a hollow cylindrical core having a fluid inlet at one end and a lateral outlet at its opposite end, a shaft concentrically arranged in said core and spaced from the inner walls thereof to provide a channel, means operable upon rotative movement of said shaft to admit fluid to said channel, a head on one end of said shaft, a shoulder on said head disposed inwardly of the edges of said lateral outlet, a hollow cylinder enclosing said head and fitting within said core, said cylinder having a port therein adjacent to said lateral opening, and means for moving said cylinder longitudinally of said head to position said port beyond said shoulder.

3. In a valve structure, a cylindrical valve body having a mixing chamber at one end thereof, a core in said body communicating at one end with said mixing chamber and having a lateral port at its opposite end, a shaft mounted for rotative movement in said core and spaced from the inner walls thereof, means operable upon rotative movement of said shaft to control the flow of fluid from said mixing chamber to the space between said shaft and said core wall, a head on said shaft adjacent to said lateral port, a shoulder on said head disposed inwardly of the edges of said lateral port, a cylinder enclosing said head and having its walls interposed between said head and the inner walls of said core, said cylinder walls having openings therein normally closed by said shoulder, a lever pivoted on said shaft, and a connection between said lever and said cylinder whereby movement of said lever will slide said cylinder longitudinally of said shaft to move said openings beyond said shoulder.

4. In a valve structure, a hollow cylindrical housing having a fluid inlet at its lower end, a core disposed within said housing and having a portion spaced from the said housing to provide a chamber and having a lateral port at its outer end, said core having passages in its walls establishing communication between said chamber and the interior of said core, a shaft rotatably and longitudinally movable in said core and of less diameter than the latter, a head at the outer end of said shaft, a shoulder on said head, a hollow cylinder enclosing said head and having its walls interposed between said head and the inner walls of said core, said cylinder having an opening in its side wall normally spaced beyond the edges of said shoulder and at all times aligned with said lateral port, a lever mounted on said shaft head, and a connection between said lever and said cylinder whereby movements of the lever will reciprocate said cylinder on said head.

5. In a valve structure, a hollow cylindrical housing having a fluid inlet at its lower end, a core spaced concentrically within said housing having a lateral outlet at its upper end, said core spaced above said inlet at its lower end to provide a valve seat and having openings in its side wall communicating with the interior of said housing, a shaft mounted for rotative and longitudinal movement within said core, a valve body on the lower end of said shaft to engage with said valve seat, said shaft having a portion of less diameter than said core to provide a passage, said core having openings therein communicating with said passage, a head on the upper end of said shaft, a shoulder at the lower end of said head disposed within the edges of said lateral outlet, a hollow cylinder enclosing and snugly engaging said head and having its walls snugly engaging the inner wall of said core, said cylinder having an opening in its side wall in register with said lateral outlet and normally disposed against said head, and a lever rockably mounted on the upper end of said shaft for sliding said cylinder longitudinally of said shaft and for rotating the latter.

6. In a valve structure, a hollow cylindrical housing having oppositely directed fluid inlets at its lower end, a core spaced concentrically within said housing having a lateral outlet at its upper end, said core spaced above said inlet at its lower end to provide a valve seat and having openings in its side wall communicating with the interior of said housing, a shaft disposed centrally within said core, a thread on said shaft engaged with threads in said core whereby rotative movement of said shaft moves the latter longitudinally in said core, an annulus on said shaft below said valve seat, a hollow bell integral with the lower end of said shaft and having lateral openings therein for communication with said fluid inlets, said shaft above said threads being of reduced diameter to provide a chamber between said shaft and said core, said core having openings therein establishing communication between said chamber and the interior of said housing, a head on the upper end of said shaft having a shoulder disposed within the edges of said lateral outlet, a hollow cylinder snugly enclosing said head and having an opening in its side wall in register with said lateral outlet and normally disposed against said head, a lever affixed to the upper end of said shaft for rotating the same, said lever capable of movement in a plane parallel with the axis of said shaft, and a connection between said lever and said cylinder whereby the latter may be slid longitudinally of said shaft.

7. In a valve structure, an upright cylindrical valve body having a liquid inlet at its lower end, a hollow core in said body having a lateral outlet near its upper end, a hollow cylinder mounted for sliding movement longitudinally within said core and having a lateral opening in communication with said outlet, a shaft mounted for rotary and sliding movement longitudinally within said core, means operable upon rotary movement of said shaft for admitting fluid to the lower end of said valve body, a head on the upper end of said shaft fitting within said cylinder, a shoulder on said head disposed within the edges of said outlet, a cap plate secured to the upper end of said shaft and rotatable therewith, said plate having spaced apertures therein, ears projecting upwardly from said cylinder and passing through said apertures, a lever pivoted inwardly of its ends to said cap plate, and a pivot pin connecting said lever with said ears, whereby rocking movement of said lever on its pivot will slide said cylinder longitudinally upon said head.

References Cited in the file of this patent
UNITED STATES PATENTS

| 2,644,483 | Parker | July 7, 1953 |
| 2,684,691 | Strickler | July 27, 1954 |
| 2,693,826 | Vaughan | Nov. 9, 1954 |

FOREIGN PATENTS

| 1,032,975 | France | Apr. 1, 1953 |